United States Patent
Mudulodu

(10) Patent No.: US 12,432,093 B2
(45) Date of Patent: Sep. 30, 2025

(54) METHODS AND SYSTEM FOR IMPROVING CHANNEL ESTIMATION IN A RECEIVER

(71) Applicant: Silicon Laboratories Inc., Austin, TX (US)

(72) Inventor: Sriram Mudulodu, Hyderabad (IN)

(73) Assignee: Silicon Laboratories Inc., Austin, TX (US)

(*) Notice: Subject to any disclaimer, the term of this patent is extended or adjusted under 35 U.S.C. 154(b) by 18 days.

(21) Appl. No.: 18/524,143

(22) Filed: Nov. 30, 2023

(65) Prior Publication Data

US 2025/0184184 A1 Jun. 5, 2025

(51) Int. Cl.
*H04L 25/02* (2006.01)

(52) U.S. Cl.
CPC ................. *H04L 25/0202* (2013.01)

(58) Field of Classification Search
CPC .................................................. H04L 25/0202
See application file for complete search history.

(56) References Cited

U.S. PATENT DOCUMENTS

| | | | |
|---|---|---|---|
| 7,224,714 B1 * | 5/2007 | Barman | H04L 27/2071 375/140 |
| 8,437,415 B2 | 5/2013 | Mudulodu et al. | |
| 8,576,961 B1 * | 11/2013 | Zhu | H04L 27/2665 375/348 |
| 8,644,426 B1 | 2/2014 | Zhou et al. | |
| 10,827,451 B2 | 11/2020 | Mudulodu | |
| 10,833,895 B2 * | 11/2020 | Ganesan | H04L 25/0216 |
| 2004/0252244 A1 * | 12/2004 | Bae | H04B 7/088 348/705 |
| 2007/0155341 A1 | 7/2007 | Haiut | |
| 2008/0137788 A1 * | 6/2008 | Bang | H04L 25/0236 375/350 |
| 2008/0285632 A1 * | 11/2008 | Jayaraman | H04B 1/7075 375/150 |
| 2018/0219717 A1 * | 8/2018 | Lee | H04W 56/0015 |

(Continued)

FOREIGN PATENT DOCUMENTS

| | | | | |
|---|---|---|---|---|
| CA | 2698298 C | * | 10/2016 | ........ H03M 13/1515 |
| GB | 2395623 A | * | 5/2004 | ........ H04L 25/0216 |
| WO | WO-2009038408 A2 | * | 3/2009 | ........ H03M 13/1515 |

OTHER PUBLICATIONS

Sriram Mudulodu, U.S. Appl. No. 17/472,935, filed Sep. 13, 2021, entitled "System, Apparatus and Method for Acquisition of Signals in Wireless Systems With Adverse Oscillator Variations", 30 pgs.

(Continued)

*Primary Examiner* — Jean B Corrielus
(74) *Attorney, Agent, or Firm* — Trop, Pruner & Hu, P.C.

(57) ABSTRACT

In one aspect, a receiver includes a digital processor having a digital signal processing path that comprises: a packet detector to detect a packet; a channel profile circuit coupled to the packet detector to determine a channel profile of a channel via which the packet is received; a fast Fourier transform (FFT) engine to convert time domain samples of the packet to frequency domain samples; and a plurality of smoothing filters. The receiver further includes a controller coupled to the channel profile circuit to select one of the plurality of smoothing filters to couple into the digital signal processing path based at least in part on the channel profile.

19 Claims, 5 Drawing Sheets

(56) References Cited

U.S. PATENT DOCUMENTS

2021/0075557 A1    3/2021  Mudulodu et al.
2021/0385063 A1*  12/2021  Wang .................. H04B 7/0885

OTHER PUBLICATIONS

Sriram Mudulodu, U.S. Appl. No. 18/325,474, filed May 30, 2023, entitled "System, Method and Apparatus for Antenna Selection in a Wireless Communication System", 29 pgs.

* cited by examiner

METHODS AND SYSTEM FOR IMPROVING CHANNEL ESTIMATION IN A RECEIVER

BACKGROUND

In Wireless Local Area Network (WLAN)-Orthogonal Frequency Division Multiplexing (OFDM) systems, a frequency domain impulse response of a channel (H) is obtained using training field information present in a packet, typically one or more Long Training Fields (LTFs). Channel responses are obtained in the frequency domain over subcarriers of one or more symbols, and are correlated. Receivers often include a channel filter to perform channel smoothing to decrease the impact of noise on the estimates and improve the performance. However, it is difficult to configure this filter or select a suitable filter to accommodate all channel conditions.

SUMMARY OF INVENTION

In one aspect, a receiver includes: an analog front end (AFE) circuit to receive and process an incoming radio frequency (RF) signal comprising a packet; an analog-to-digital converter (ADC) coupled to the AFE circuit to receive and digitize the processed incoming RF signal into a digital signal; a digital processor coupled to the ADC. The digital processor has a digital signal processing path that comprises: a packet detector to detect the packet; a channel profile circuit coupled to the packet detector, the channel profile circuit to determine a channel profile of a channel via which the packet is received; a fast Fourier transform (FFT) engine to convert time domain samples of the packet to frequency domain samples; and a plurality of smoothing filters. The receiver further includes a controller coupled to the channel profile circuit, the controller to select one of the plurality of smoothing filters to couple into the digital signal processing path based at least in part on the channel profile.

In an implementation, the controller is to: calculate metric information based on the channel profile; and select the one of the plurality of smoothing filters based at least in part on the metric information. The channel profile circuit may include at least one correlator to determine cross-correlation information based at least in part on the time domain samples. The controller is to calculate the metric information comprising a plurality of metric values, each of the plurality of metric values corresponding to a ratio between a peak cross-correlation value and another cross-correlation value. The controller is to: select a first smoothing filter of the plurality of smoothing filters when a first number of metric values of the plurality of metric values is less than a first threshold, and select a second smoothing filter of the plurality of smoothing filters when a second number of metric values of the plurality of metric values exceeds the first threshold.

In an implementation, the controller is to calculate the metric information comprising a metric value corresponding to a ratio between a first set of cross-correlation values and a second set of cross-correlation values, the first set of cross-correlation values comprising a peak cross-correlation value. The controller may be configured to calculate the metric value corresponding to the ratio between the first set of cross-correlation values comprising a first sum of cross-correlation values and the second set of cross-correlation values comprising a second sum of cross-correlation values. The controller may: select a first smoothing filter of the plurality of smoothing filters when the metric value exceeds a threshold; and select a second smoothing filter of the plurality of smoothing filters when the metric value is less than the threshold.

In an implementation, the first smoothing filter comprises a narrowband finite impulse response filter and the second smoothing filter comprises a wideband finite impulse response filter.

In one implementation, the controller is to: select a first smoothing filter of the plurality of smoothing filters when the channel profile is indicative of an additive white Gaussian noise channel; and select a second smoothing filter of the plurality of smoothing filters when the channel profile is indicative of a multipath channel. The digital signal processing path may further include a channel estimator coupled to an input of the selected smoothing filter to receive unsmoothed frequency domain samples, the channel estimator to determine smoothed frequency domain samples.

In another aspect, a method includes: obtaining, in a receiver, digital samples from an incoming radio frequency signal; calculating cross-correlation information for at least a portion of the digital samples; determining a channel profile based at least in part on the cross-correlation information; selecting a smoothing filter of a plurality of smoothing filters of the receiver based at least in part on the channel profile; and coupling the selected smoothing filter into a digital signal processing path of the receiver.

In an implementation, the method further comprises: calculating the cross-correlation information using time domain samples of a training field portion of the digital samples; and smoothing frequency domain channel estimate samples obtained from a channel estimator using the selected smoothing filter. The method may also include: receiving smoothed frequency channel estimate samples from an output of the selected smoothing filter; determining channel estimates for the smoothed frequency domain samples; providing the smoothed channel estimates to a decoder of the receiver; and decoding a plurality of data symbols in the decoder using the smoothed channel estimates for an equalization process to obtain message content of the digital samples.

In an implementation, the method includes calculating metric information using the cross-correlation information. Calculating the metric information using the cross-correlation information may include: calculating a plurality of metric values, each of the plurality of metric values corresponding to a ratio between a peak cross-correlation value and another cross-correlation value. The method may also include: determining the channel profile based at least in part on the metric information; selecting a first smoothing filter of the plurality of smoothing filters when the channel profile is indicative of an additive white Gaussian noise channel; and selecting a second smoothing filter of the plurality of smoothing filters when the channel profile is indicative of a multipath channel.

In yet another aspect, a wireless device includes: an antenna; an AFE circuit coupled to the antenna to receive and process an incoming RF signal comprising a packet; a digitizer coupled to the AFE circuit to receive and digitize the processed incoming RF signal into a digital signal; and a baseband processor coupled to the digitizer. The baseband processor may have a digital signal processing path comprising: a packet detector to detect the packet; at least one correlator to generate cross-correlation information for at least a portion of a training field of the packet; a plurality of smoothing filters. The wireless device further includes a controller to receive the cross-correlation information and calculate one or more metric values based at least in part thereon, the controller to select one of the plurality of smoothing filters to couple into the digital signal processing path based at least in part on the one or more metric values.

In an implementation, the controller is to calculate the one or more metric values comprising a plurality of metric values, each of the plurality of metric values corresponding to a ratio between a peak cross-correlation value and another cross-correlation value, the controller is to select a narrowband smoothing filter of the plurality of smoothing filters when a first metric value of the plurality of metric values is indicative of an additive white Gaussian noise channel profile.

In an implementation, the controller is to calculate the one or more metric values that is a single metric value, the single metric value corresponding to a ratio between a first set of cross-correlation values and a second set of cross-correlation values, the first set of cross-correlation values comprising a peak cross-correlation value, the controller is to select a wideband smoothing filter of the plurality of smoothing filters when the single metric value is indicative of a multipath channel profile.

DETAILED DESCRIPTION

Figure 1:
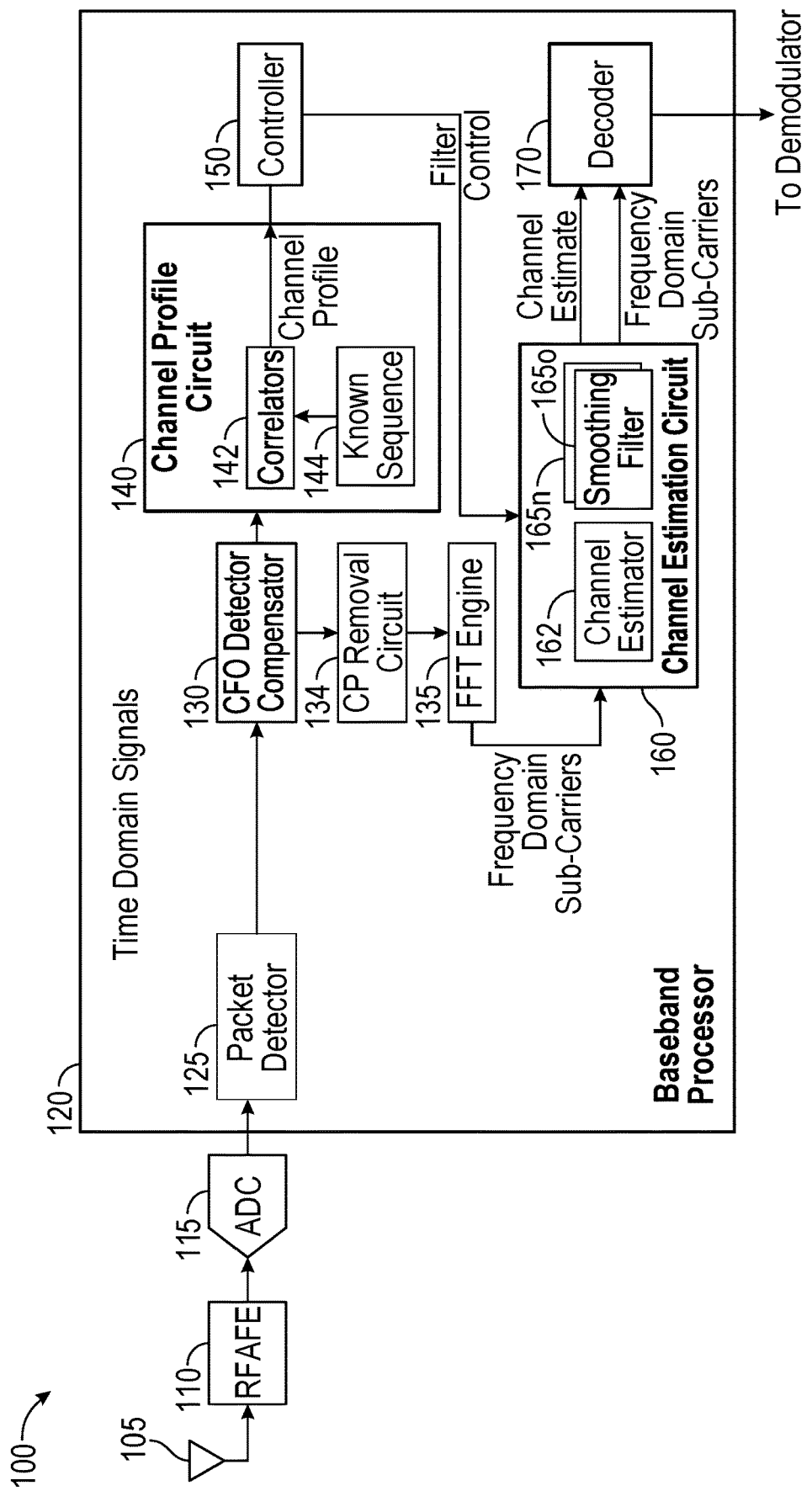
FIG. 1 is a block diagram of a receiver in accordance with an embodiment.

In various embodiments, a receiver includes multiple filters that can be used to filter incoming frequency domain channel information obtained using a channel estimation process to perform channel smoothing, where the receiver uses the channel smoothed information for performing equalization on data symbols. One of the multiple channel filters can be selected for use in performing the channel smoothing based at least in part on a profile of the channel.

In an embodiment, channel smoothing is performed using a finite impulse response (FIR) filter. In this filtering operation, a frequency domain channel is convolved with the filter, which can be implemented as a time domain FIR filter to perform the smoothing operation. Characteristics of the FIR filter can be a significant factor having an impact on receiver performance. Thus, by way of selecting an appropriate one of multiple filters present within the receiver, performance is increased.

Delay spread is one of the parameters on which multipath channels can be characterized. Delay spread is the time difference between first and last significant reflections/paths, and RMS delay spread can also be computed based on the channel profile, which is a measure of multipath richness of the channel. The cyclic prefix (CP) present between OFDM symbols helps to handle the multipath effects. Typically, the CP has to be greater than the delay spread of the channel in order to handle the multipath scenarios.

Considering the scenario of a purely Additive White Gaussian Noise (AWGN) channel with no multipath components, significant energy in the time domain channel impulse response is confined to a few (e.g., 1 to 2) samples around a center sample. In a multipath scenario, energy in the time domain impulse response is observed over multiple samples around the center, based on the delay spread of the multipath channel. For example, if the delay spread of a channel is 0.4 micro-seconds (usec), the time domain impulse response has significant components around a total of 8 samples (where a sampling rate is 20 megahertz (MHz)). Thus, for an AWGN scenario, a smoothing filter with a narrow pass band (that spans over the number of samples where energy is present) is suitable to give a best performance scenario.

However, for a multipath scenario, the smoothing filter may have a wider pass band as compared to the AWGN scenario described above. For a multipath scenario, a smoothing filter may be configured with a pass band covering the samples where significant energy is present in the time domain channel impulse response.

In various embodiments, a receiver may include N filters, a given one of which can be suitably selected based on the channel profile. In an embodiment, a system may have only two filters (N=2), such that one filter is used for an AWGN scenario and the other filter is used for a multipath case.

In general, using a wider filter for an AWGN scenario results in performance degradation (as it allows more noise components/samples into a pass band), compared to using a narrower filter. In contrast, using a narrower filter for a multipath scenario results in issues, since channel information can be filtered/lost. Embodiments thus provide techniques to select a given smoothing filter based on a channel profile.

Referring now to FIG. 1, shown is a block diagram of a receiver in accordance with an embodiment. As shown in FIG. 1, receiver 100 may be part of any type of wireless device, ranging from small portable Internet of Things (IoT) devices to smartphones, smartwatches, tablets or other wireless devices.

As illustrated, device 100 receives incoming radio frequency (RF) signals via an antenna 105, which provides the RF signals to an RF analog front end (AFE) circuit 110. In various implementations, AFE circuit 110 may include various filtering circuitry including an analog filter, gain circuitry including a programmable gain amplifier (PGA), a mixer to downconvert RF signals to lower frequency signals, e.g., intermediate frequency (IF) signals such as low-IF, zero IF, or other lower frequency signals. AFE circuit 110 may include additional circuitry. The resulting processed lower frequency signals are in turn provided to an analog-to-digital converter (ADC) 115, which converts the signals to a digital stream that is provided to a baseband processor 120. Baseband processor 120 is shown in the high level of FIG. 1 to include various circuitry relevant for performing the smoothing filter control operation described herein.

As illustrated, incoming baseband digital baseband signals are provided to a packet detector 125, which detects a beginning of a packet. In an embodiment, cyclic prefix removal is done after fine symbol timing obtained by processing a legacy long training field (L-LTF) field of the packet. The resulting packet information is next provided to a carrier frequency offset (CFO) detector/compensator 130 which may detect a CFO that exists between receiver and transmitter. CFO detector/compensator 130 also compensates for the device's carrier frequency offset. The resulting compensated time domain samples are provided to a channel profile circuit 140 and a cyclic prefix removal circuit 134, which further removes the cyclic prefix. The cyclic prefix-removed time domain OFDM samples are given as input to a fast Fourier transform (FFT) engine 135, which converts the incoming time domain samples into the frequency domain, namely as a plurality of sub-carriers. Relevant to the discussion herein, these sub-carriers include data sub-carriers and additional so-called pilot sub-carriers, which are known sub-carriers distributed throughout the frequency domain to enable channel estimation and other processing to be performed.

The resulting frequency domain signals are provided to a channel estimation circuit 160. In an embodiment, the FFT input is circular shifted by few samples so as to simplify the smoothing operation, such that the frequency domain channel smoothing can be done by a real coefficient low pass filter instead of a complex coefficient band pass filter.

In embodiments herein, channel profile circuit 140 may be configured to determine a channel profile from the time domain samples. To this end, these samples are provided to a set of correlators 142, which may perform a cross-correlation between the time domain samples and a known sequence stored in a storage 144. In an embodiment, this known sequence may correspond to a given portion of a packet preamble such as the LTF. In turn, channel profile circuit 140 may determine a channel profile based at least in part on the cross-correlation information.

In an embodiment, a channel profile is obtained using a L-LTF-based cross-correlation method. In this method, the received L-LTF portion/samples of the packet are correlated with expected/stored L-LTF samples. During the cross-correlation operation, fine symbol timing may not yet have been determined. But based on a legacy short training field (L-STF), coarse timing is available. A CFO between the two devices is ensured to be as low as possible. In an embodiment, the cross-correlation operation is performed after compensation of a coarse CFO obtained from the L-STF. In another embodiment, the cross-correlation operation is performed after compensation of coarse CFO estimate and a fine CFO estimate (after it is determined). In an embodiment, the fine CFO estimate is obtained using L-LTF field. In a particular embodiment for communication using IEEE 802.11ax frames, a channel estimate can be obtained from L-LTF (pre-high efficiency (HE)) and/or HE-LTF fields.

The cross-correlation output is used to determine the type of channel and smoothing filter selection. The channel profile information in turn is provided to a controller 150. Herein, controller 150 is configured to determine an appropriate smoothing filter to be used, based at least in part on the channel profile information. More specifically, controller 150 may select a given smoothing filter depending on the channel profile. Although the discussion herein regards a channel profile that identifies a channel as either being either an AWGN channel profile or a multipath channel profile, other channel profiles may be identified in other embodiments. For example, there are different types of multipath channels and are characterized or grouped based on delay profile and spread of the channel. The channels are also characterized based on Doppler measurement.

As seen, controller 150 provides filter control signaling to channel estimation circuit 160. In response to this signaling, channel estimation circuit 160, which includes a channel estimator 162 and multiple smoothing filters 1650-$n$, configures a receiver signal processing path to include a selected one of smoothing filters 165. That is, based at least in part on the channel profile information, a given smoothing filter 165 is selected for use in processing the incoming frequency domain information within channel estimator 162, as received from FFT engine 135. This channel smoothing filter selection may include configuring a particular channel smoothing filter into the receiver signal processing path by way of one or more switches or so forth. In addition, controller 150 may set parameters of the selected channel smoothing filter, including bandwidth, filter taps, and so forth. Although controller 150 is shown as being included in baseband processor 120, in other embodiments, controller 150 may be separate from baseband processor 120. The selection of the channel smoothing filter or the parameters of the channel smoothing filters are determined based on the metrics computed on the determined channel profiled and is explained with examples in upcoming sections.

Still referring to FIG. 1, the channel estimate, along with the frequency domain data sub-carriers, are provided to a decoder 170, which decodes data sub-carriers into a set of bits that in turn are provided to additional receiver blocks for further processing or to a media access control (MAC) layer. Although shown at this high level in the embodiment of FIG. 1, many variations and alternatives are possible.

Figure 2:
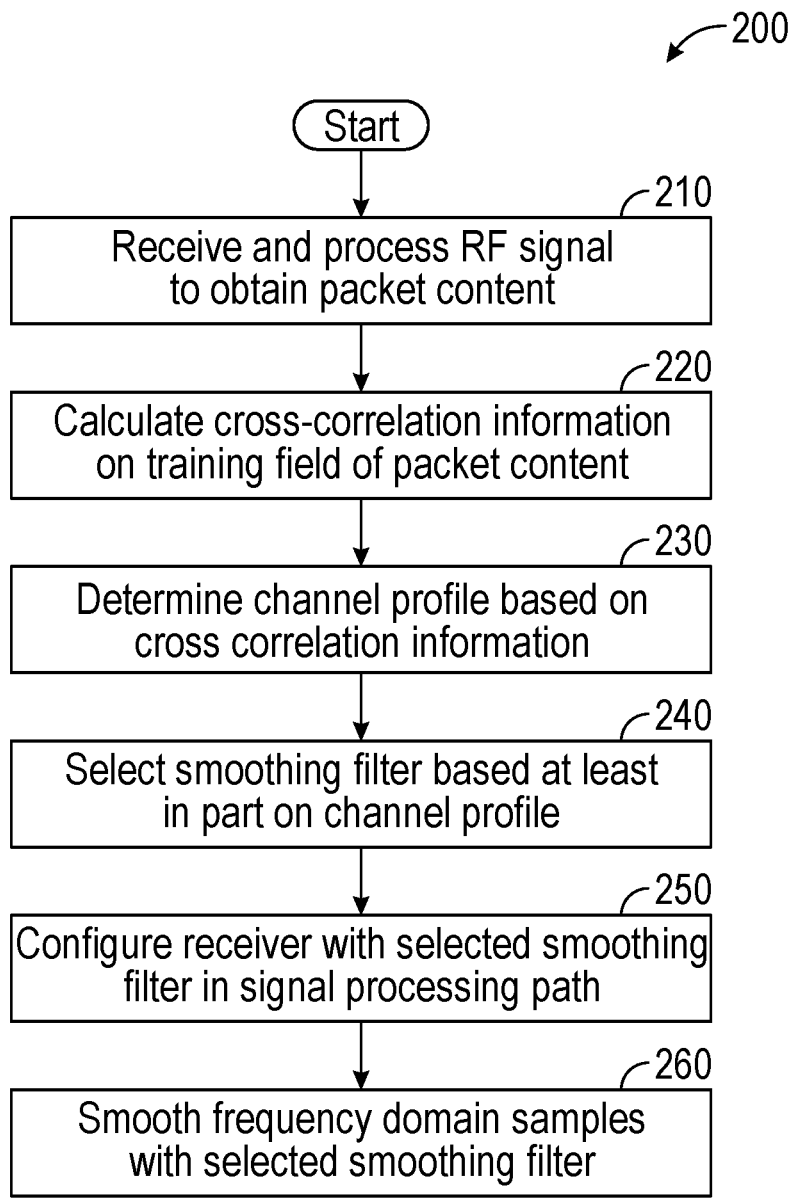
FIG. 2 is a flow diagram of a method in accordance with an embodiment.

Referring now to FIG. 2, shown is a flow diagram of a method in accordance with an embodiment. In FIG. 2, method 200 is a method for selecting an appropriate smoothing filter in accordance with an embodiment. Method 200 may be performed by hardware circuitry such as a controller of a receiver alone and/or in combination with firmware and/or software, which may be implemented as instructions stored in a non-transitory storage medium.

As illustrated, method 200 begins by receiving and processing an incoming RF signal to obtain packet content (block 210). Such processing may be performed within a receiver signal processing path. Next at block 220, cross-correlation information may be calculated on a training field of the packet content. For example, a channel profile circuit may perform a cross-correlation between a LTF present in a header of the packet and a known LTF time domains sequence/samples.

Still referring to FIG. 2, the resulting cross-correlation information may be provided to a channel profile circuit, which determines a channel profile based at least in part on this cross-correlation information (block 230). Next at block 240, a controller may be configured to select a given one of multiple smoothing filters for use in performing channel estimation based at least in part on the channel profile.

As one example, assume a receiver having 8 filters (e.g., implemented as low pass filters (LPFs)) with different passband bandwidths. Consider the peak of the cross correlation as a first sample and its energy as $E_1$, and the energy of sample k after this peak as $E_k$. In an embodiment, the $E_k$ is the energy of the $K^{th}$ peak in the cross-correlation output. With this nomenclature, the controller may calculate metrics according to the following:

$$\text{Metric1}(k) = \frac{E_k}{E_1} \text{ where } k = 2 \text{ to } 9 \qquad \text{(Eq. 1)}$$

The value of this metric is determined for the iterations of k. From the determined metrics, the controller identifies a given metric having a value below a threshold (e.g., Metric1 is less than 0.01 (Threshold1)). Based on the value of k that is determined, the corresponding filter is coupled into the receiver signal processing path and used for smoothing purposes. There can be multiple values of k at which Metric1 is greater than Threshold1. The highest value of k for which Metric 1 is not less than Threshold1 is used for smoothing filter selection.

In another example, assume a receiver having 2 filters (e.g., LPFs) available with different passband bandwidths.

For example, a first filter may be configured as a narrow band filter (having a passband of between −0.625 MHz and +0.625 MHZ) and a second filter may be configured as a wide band filter (having a passband of between −1.56 MHz and +1.56 MHz).

In this example, the controller may calculate a metric according to the following:

$$\text{Metric2} = \frac{E_{peak} + E_{peak+1} + E_{peak+2}}{E_{peak-1} + E_{peak+3} + E_{peak+4} + E_{peak+5} + E_{peak+6} + E_{peak+7} + E_{peak+8}} \quad \text{(Eq. 2)}$$

The controller may select the appropriate filter based on the value of this metric. For example, if this metric has a value below a given threshold (e.g., Metric2 is less than 0.35 (Threshold2)), the controller selects the wider bandwidth filter; otherwise, the narrow bandwidth filter is used.

As further shown in FIG. 2, at block 250 the receiver is configured with the selected smoothing filter into the receiver signal processing path. To this end, various switching may be performed to route the incoming frequency domain sub-carriers through the selected smoothing filter. In addition, appropriate configuration of the smoothing filter may be performed, including setting a given bandwidth and a given number of filter taps. Finally, at block 260, frequency domain samples may be smoothed with the selected smoothing filter. As such, a more accurate channel estimate is determined and provided for use in decoding operations. Although shown at this high level in the embodiment of FIG. 2, many variations and alternatives are possible. For example, other smoothing techniques can be used such as by nulling out a few samples in the time domain impulse response of the channel (by taking an inverse FFT (IFFT) of H) and converting it back to the frequency domain (using a FFT engine).

Figure 3:
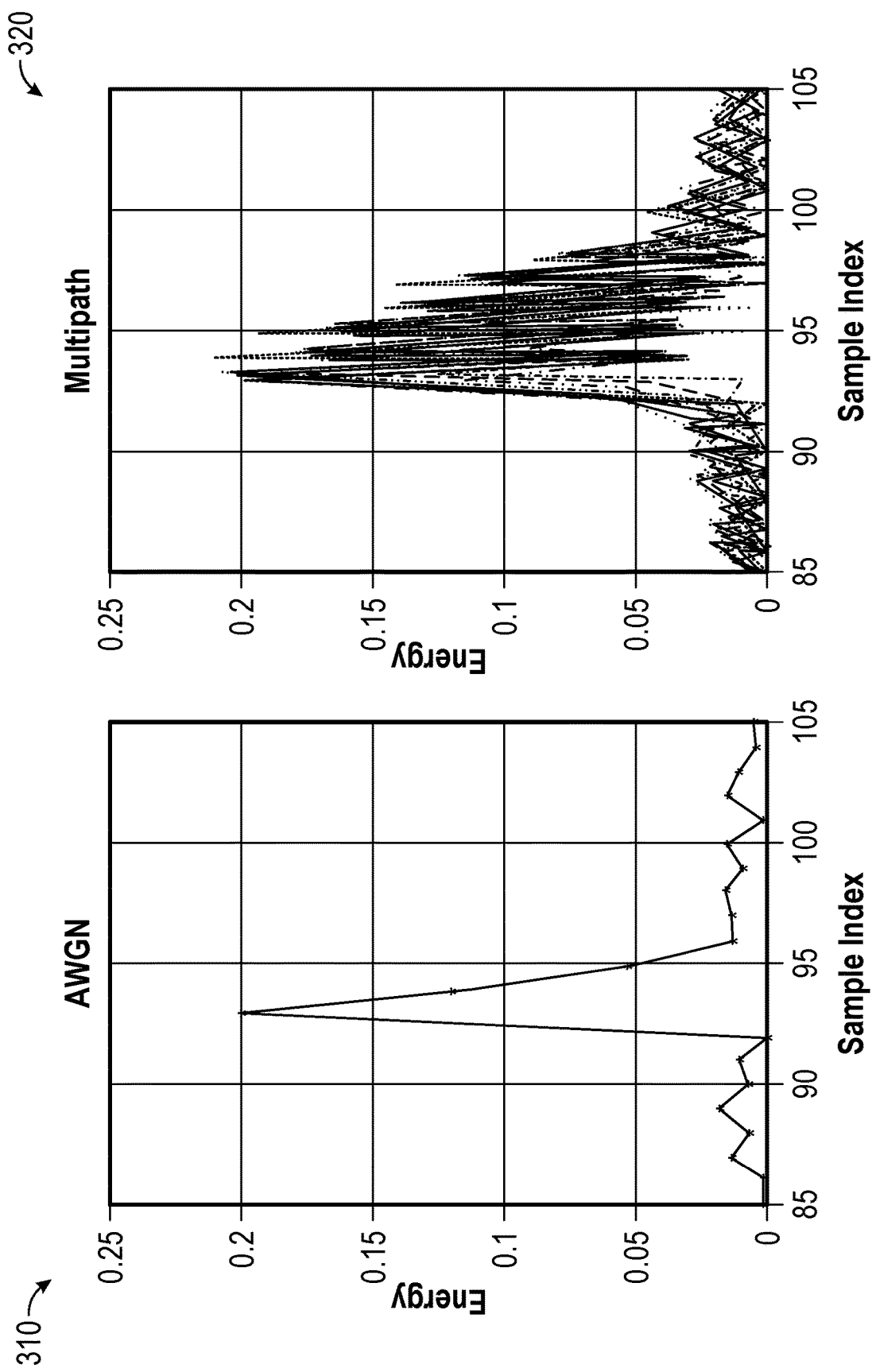
FIG. 3 is a graphical illustration of cross-correlation output plots for an AWGN channel and a multipath channel.

Referring now to FIG. 3, shown are graphical illustrations of cross-correlation output plots for an AWGN channel (illustration 310) and a multipath channel (whose RMS delay spread is 50 nanoseconds) (illustration 320). As shown, the bulk of the energy is in a smaller bandwidth for the AWGN case as compared to the multipath case, and thus filter selection may proceed accordingly.

Figure 4:
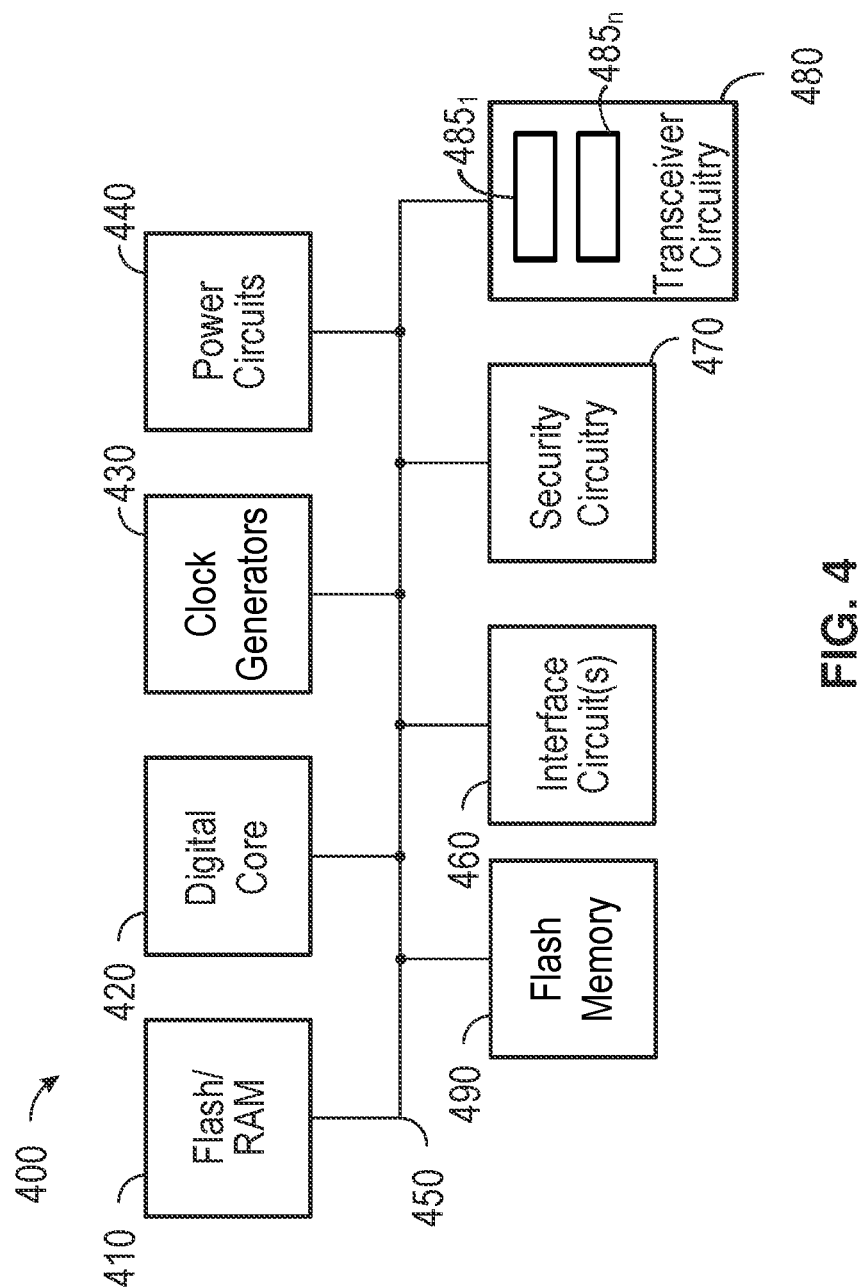
FIG. 4 is a block diagram of a representative integrated circuit that incorporates an embodiment.

Referring now to FIG. 4, shown is a block diagram of a representative integrated circuit 400 that includes channel smoothing filter selection circuitry as described herein. In the embodiment shown in FIG. 4, integrated circuit 400 may be, e.g., a dual mode wireless transceiver that may operate according to one or more wireless protocols (e.g., WLAN and Bluetooth, among others) or other device that can be used in a variety of use cases. In one or more embodiments, the circuitry of integrated circuit 400 shown in FIG. 4 may be implemented on a single semiconductor die.

Integrated circuit 400 may be included in a range of devices including a variety of stations, including smartphones, wearables, smart home devices, other consumer devices, or industrial, scientific, and medical (ISM) devices, among others.

In the embodiment shown, integrated circuit 400 includes a memory system 410 which in an embodiment may include volatile storage, such as RAM and non-volatile memory as a flash memory. As further shown integrated circuit 400 also may include a separate flash memory 490 (or other non-volatile memory), optionally. Flash memory 490 may be implemented as a non-transitory storage medium that can store instructions and data. Such non-volatile memory may store instructions, including instructions for performing channel smoothing filter selection, as described herein.

Memory system 410 couples via a bus 450 to a digital core 420, which may include one or more cores and/or microcontrollers that act as a main processing unit of the integrated circuit. In turn, digital core 420 may couple to clock generators 430 which may provide one or more phase locked loops or other clock generator circuitry to generate various clocks for use by circuitry of the IC.

As further illustrated, IC 400 further includes power circuitry 440, which may include one or more voltage regulators. Additional circuitry may optionally be present depending on particular implementation to provide various functionality and interaction with external devices. Such circuitry may include interface circuitry 460 which may provide a LAN or other interface with various off-chip devices, and security circuitry 470 which may perform wireless security techniques.

In addition, as shown in FIG. 4, transceiver circuitry 480 may be provided to enable transmission and receipt of wireless signals, e.g., according to one or more of a local area or wide area wireless communication scheme, such as Zigbee, Bluetooth, IEEE 802.11, IEEE 802.15.4, cellular communication or so forth. As shown, transceiver circuitry 480 includes a plurality of channel smoothing filters $485_{1-n}$ that can be dynamically selected, based on channel profile information as described herein. Understand while shown with this high level view, many variations and alternatives are possible.

Figure 5:
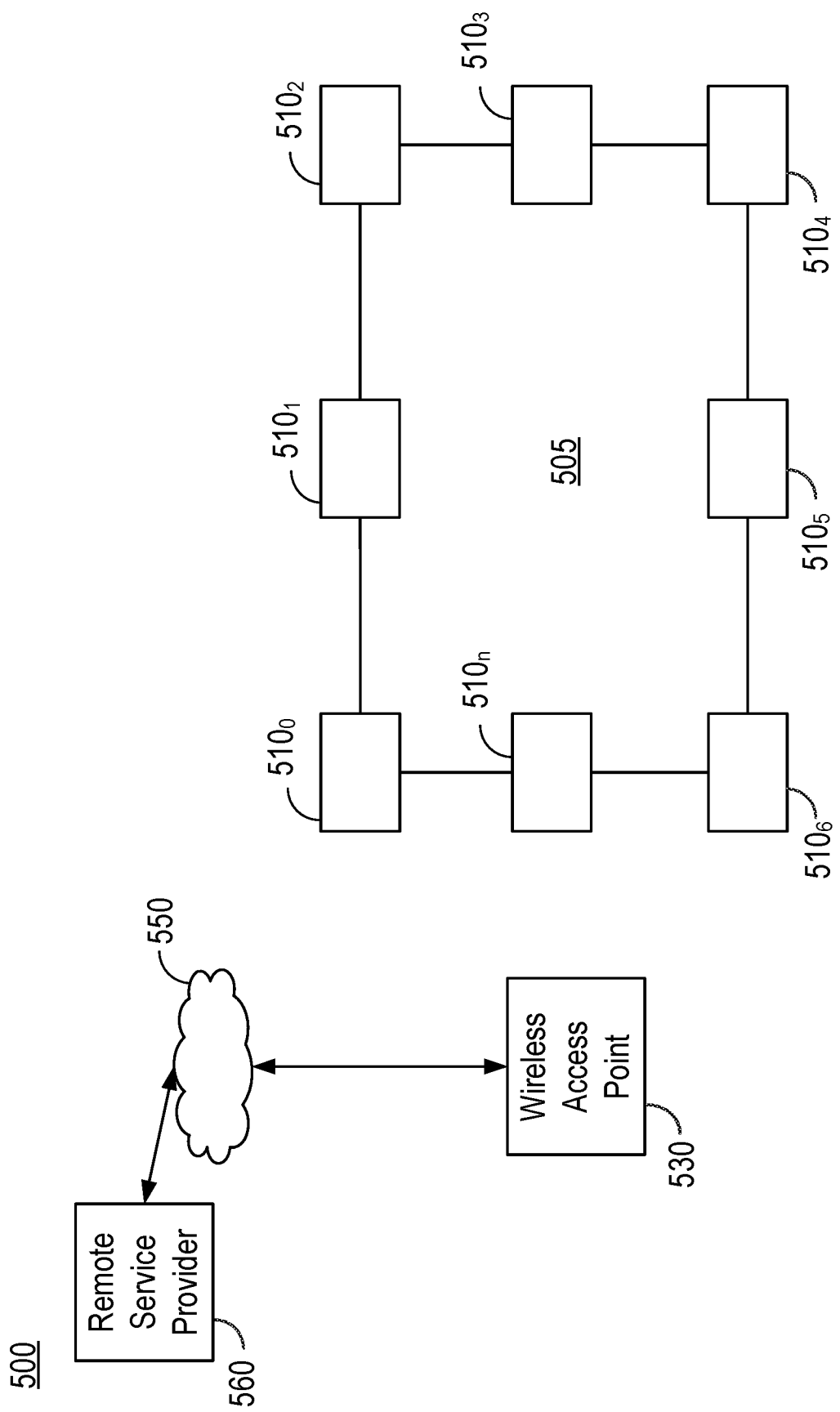
FIG. 5 is a high level diagram of a network in accordance with an embodiment.

ICs such as described herein may be implemented in a variety of different devices such as wireless stations, IoT devices or so forth. Referring now to FIG. 5, shown is a high level diagram of a network in accordance with an embodiment. As shown in FIG. 5, a network 500 includes a variety of devices, including wireless stations including smart devices such as IoT devices, access points and remote service providers, which may leverage embodiments for selection of suitable channel smoothing filters.

In the embodiment of FIG. 5, a wireless network 505 is present, e.g., in a building having multiple wireless devices 5100-n. As shown, wireless devices 510 couple to an access point 530 that in turn communicates with a remote service provider 560 via a wide area network 550, e.g., the internet. Understand while shown at this high level in the embodiment of FIG. 5, many variations and alternatives are possible.

While the present disclosure has been described with respect to a limited number of implementations, those skilled in the art, having the benefit of this disclosure, will appreciate numerous modifications and variations therefrom. It is intended that the appended claims cover all such modifications and variations.

What is claimed is:

1. A receiver comprising:
   an analog front end (AFE) circuit to receive and process an incoming radio frequency (RF) signal comprising a packet;
   an analog-to-digital converter (ADC) coupled to the AFE circuit to receive and digitize the processed incoming RF signal into a digital signal;
   a digital processor coupled to the ADC, the digital processor having a digital signal processing path comprising:
   a packet detector to detect the packet;
   a channel profile circuit coupled to the packet detector, the channel profile circuit to determine a channel profile of a channel via which the packet is received;

a fast Fourier transform (FFT) engine to convert time domain samples of the packet to frequency domain samples; and
a plurality of smoothing filters; and
a controller coupled to the channel profile circuit, the controller to select one of the plurality of smoothing filters to couple into the digital signal processing path based at least in part on the channel profile.

2. The receiver of claim 1, wherein the controller is to:
calculate metric information based on the channel profile; and
select the one of the plurality of smoothing filters based at least in part on the metric information.

3. The receiver of claim 1, wherein the channel profile circuit comprises at least one correlator to determine cross-correlation information based at least in part on the time domain samples.

4. The receiver of claim 1, wherein the controller is to calculate metric information comprising a plurality of metric values, each of the plurality of metric values corresponding to a ratio between a peak cross-correlation value and another cross-correlation value.

5. The receiver of claim 4, wherein the controller is to:
select a first smoothing filter of the plurality of smoothing filters when a first number of metric values of the plurality of metric values is less than a first threshold, and
select a second smoothing filter of the plurality of smoothing filters when a second number of metric values of the plurality of metric values exceeds the first threshold.

6. The receiver of claim 1, wherein the controller is to calculate metric information comprising a metric value corresponding to a ratio between a first set of cross-correlation values and a second set of cross-correlation values, the first set of cross-correlation values comprising a peak cross-correlation value.

7. The receiver of claim 6, wherein the controller is to calculate the metric value corresponding to the ratio between the first set of cross-correlation values comprising a first sum of cross-correlation values and the second set of cross-correlation values comprising a second sum of cross-correlation values.

8. The receiver of claim 7, wherein the controller is to:
select a first smoothing filter of the plurality of smoothing filters when the metric value exceeds a threshold; and
select a second smoothing filter of the plurality of smoothing filters when the metric value is less than the threshold.

9. The receiver of claim 8, wherein the first smoothing filter comprises a narrowband finite impulse response filter and the second smoothing filter comprises a wideband finite impulse response filter.

10. The receiver of claim 1, wherein the controller is to:
select a first smoothing filter of the plurality of smoothing filters when the channel profile is indicative of an additive white Gaussian noise channel; and
select a second smoothing filter of the plurality of smoothing filters when the channel profile is indicative of a multipath channel.

11. The receiver of claim 1, wherein the digital signal processing path further comprises a channel estimator coupled to an input of the selected smoothing filter to receive unsmoothed frequency domain samples, the channel estimator to determine smoothed frequency domain samples.

12. A method comprising:
obtaining, in a receiver, digital samples from an incoming radio frequency signal;
calculating cross-correlation information for at least a portion of the digital samples using time domain samples of a training field portion of the digital samples;
determining a channel profile based at least in part on the cross-correlation information;
selecting a smoothing filter of a plurality of smoothing filters of the receiver based at least in part on the channel profile;
coupling the selected smoothing filter into a digital signal processing path of the receiver; and
smoothing frequency domain channel estimate samples obtained from a channel estimator using the selected smoothing filter.

13. The method of claim 12, further comprising:
receiving smoothed frequency channel estimate samples from an output of the selected smoothing filter;
determining channel estimates for the smoothed frequency domain samples;
providing the channel estimates to a decoder of the receiver; and
decoding a plurality of data symbols in the decoder using the channel estimates for an equalization process to obtain message content of the digital samples.

14. The method of claim 12, further comprising calculating metric information using the cross-correlation information.

15. The method of claim 14, wherein calculating the metric information using the cross-correlation information comprises:
calculating a plurality of metric values, each of the plurality of metric values corresponding to a ratio between a peak cross-correlation value and another cross-correlation value.

16. The method of claim 14, further comprising:
determining the channel profile based at least in part on the metric information;
selecting a first smoothing filter of the plurality of smoothing filters when the channel profile is indicative of an additive white Gaussian noise channel; and
selecting a second smoothing filter of the plurality of smoothing filters when the channel profile is indicative of a multipath channel.

17. A wireless device comprising:
an antenna;
an analog front end (AFE) circuit coupled to the antenna to receive and process an incoming radio frequency (RF) signal comprising a packet;
a digitizer coupled to the AFE circuit to receive and digitize the processed incoming RF signal into a digital signal;
a baseband processor coupled to the digitizer, the baseband processor having a digital signal processing path comprising:
a packet detector to detect the packet;
at least one correlator to generate cross-correlation information for at least a portion of a training field of the packet;
a plurality of smoothing filters; and
a controller to receive the cross-correlation information and calculate one or more metric values based at least in part thereon, the controller to select one of the plurality of smoothing filters to couple into the digital signal processing path based at least in part on the one or more metric values.

18. The wireless device of claim 17, wherein the controller is to calculate the one or more metric values comprising a plurality of metric values, each of the plurality of metric values corresponding to a ratio between a peak cross-correlation value and another cross-correlation value, the controller is to select a narrowband smoothing filter of the plurality of smoothing filters when a first metric value of the plurality of metric values is indicative of an additive white Gaussian noise channel profile.

19. The wireless device of claim 17, wherein the controller is to calculate the one or more metric values that is a single metric value, the single metric value corresponding to a ratio between a first set of cross-correlation values and a second set of cross-correlation values, the first set of cross-correlation values comprising a peak cross-correlation value, the controller is to select a wideband smoothing filter of the plurality of smoothing filters when the single metric value is indicative of a multipath channel profile.

* * * * *